(12) United States Patent
Sallows

(10) Patent No.: US 11,905,017 B2
(45) Date of Patent: Feb. 20, 2024

(54) AIRCRAFT WIRELESS LONG LINE

(71) Applicant: Brian Sallows, Parksville (CA)

(72) Inventor: Brian Sallows, Parksville (CA)

( * ) Notice: Subject to any disclaimer, the term of this patent is extended or adjusted under 35 U.S.C. 154(b) by 131 days.

(21) Appl. No.: 17/092,056

(22) Filed: Nov. 6, 2020

(65) Prior Publication Data

US 2021/0237875 A1 Aug. 5, 2021

(30) Foreign Application Priority Data

Nov. 7, 2019 (CA) ...................... 3061232

(51) Int. Cl.
*B64D 1/22* (2006.01)
*B66C 1/34* (2006.01)
*H01Q 1/42* (2006.01)
*H01Q 1/22* (2006.01)

(52) U.S. Cl.
CPC .................. *B64D 1/22* (2013.01); *B66C 1/34* (2013.01); *H01Q 1/2291* (2013.01); *H01Q 1/42* (2013.01)

(58) Field of Classification Search
CPC ... B64D 1/12; B64D 1/22; B66C 1/34; H01Q 1/2291; H01Q 1/42
See application file for complete search history.

(56) References Cited

U.S. PATENT DOCUMENTS

| | | | | |
|---|---|---|---|---|
| 4,073,531 A | * | 2/1978 | Androski | B66C 1/34 |
| | | | | 294/82.31 |
| 5,580,113 A | * | 12/1996 | Pomerville | B66C 1/66 |
| | | | | 294/82.35 |
| 5,609,378 A | * | 3/1997 | Bowers | B66C 1/36 |
| | | | | 294/82.19 |
| 5,636,888 A | * | 6/1997 | Kiser | B66C 1/36 |
| | | | | 294/82.19 |
| 8,172,184 B2 | * | 5/2012 | Spencer | B66C 1/36 |
| | | | | 294/82.11 |
| 8,532,846 B2 | * | 9/2013 | Tollenaere | B64D 1/22 |
| | | | | 701/13 |
| 9,004,557 B2 | | 4/2015 | Knox | |
| 9,027,976 B1 | * | 5/2015 | Tollenaere | B66C 1/127 |
| | | | | 294/75 |
| 9,132,995 B2 | | 9/2015 | Schafer | |
| 9,580,173 B1 | * | 2/2017 | Burgess | B64D 1/22 |
| 9,758,353 B2 | | 9/2017 | Schafer | |
| 10,023,312 B2 | * | 7/2018 | Repp | B64D 1/22 |
| 10,315,764 B2 | * | 6/2019 | Shannon | B66C 1/38 |
| 10,343,777 B2 | | 7/2019 | Stucki et al. | |
| 2006/0175851 A1 | | 8/2006 | Snyder | |

(Continued)

*Primary Examiner* — Dean J Kramer

(74) *Attorney, Agent, or Firm* — Baumgartner Patent Law; Marc Baumgartner

(57) ABSTRACT

A wireless assembly for use with a long line, an aircraft and a battery is provided, the wireless assembly comprising: a hook, which includes an electro-mechanical actuator; a waterproof housing mounted on the hook; a wireless receiver which includes a microprocessor, is retained in the waterproof housing and is in electrical communication with the electro-mechanical actuator; a wireless transmitter, which includes a microprocessor; and a switch which is in electrical communication with the wireless transmitter, the wireless transmitter and the switch for locating in the aircraft. A method of wirelessly controlling the release of a load from the hook is also provided.

7 Claims, 5 Drawing Sheets

(56) References Cited

U.S. PATENT DOCUMENTS

| | | |
|---|---|---|
| 2007/0052252 A1* | 3/2007 | Rohardt .................... B66C 1/34 294/82.3 |
| 2010/0230121 A1 | 9/2010 | Hall et al. |
| 2018/0215466 A1 | 8/2018 | Hall |
| 2019/0242411 A1* | 8/2019 | Karbassi ............. F15B 11/0423 |

* cited by examiner

AIRCRAFT WIRELESS LONG LINE

CROSS REFERENCE TO RELATED APPLICATIONS

The present invention claims the benefit of Canadian Patent Application Serial No. 3,061,232, filed Nov. 7, 2019, entitled "AIRCRAFT WIRELESS LONG LINE", which is hereby incorporated in its entirety including all tables, figures, and claims.

FIELD

The present technology is directed to a wireless long line for helicopters. More specifically, it is a wireless controller for attaching and detaching loads, whether slings, buckets or the like, to a long line without the need for an electrical connection between the helicopter and the load hook.

BACKGROUND

Helicopters are used to carry many different types of loads. The loads are attached to the helicopter by a long line, which extends from the helicopter to a load retainer, which may be a load hook. The long line consists of a cable, an electrical cord and a sheath that covers both the cable and the electrical cord. The load hook is attached to the load by an operator and the load is then lifted. Upon arriving at the desired location, the load is released by the pilot switching a switch, which, via the electrical cord, communicates with the release mechanism of the hook. The electrical cords are nothing more than an extension cord, which attaches to the aircraft at a female end, and to a female end of a short electrical cord at the male end. Electrical tape is used to hold the connections together.

United States Patent Application 20100230121 discloses a firefighting bucket (11) suspended from an aircraft by lines (15), has open top (12A) and a valve at base (13). The valve is attachable to the aircraft by remotely actuatable line (16) and independent movement of lines (15-16) may utilize the weight of the water to facilitate opening and closing of the valve. Dynamic sensing of a bucket attribute, e.g. weight, enables bucket (11) to be filled or discharged by a predetermined volume by the pilot. Chemical fire retardant may be added by entraining it with water discharging from the valve. There is no teaching of a wireless system for controlling the release of the load retainer.

U.S. Pat. No. 10,343,777 discloses a helicopter load hook has a release mechanism that can be mounted in a fixed position in a housing for controllable identification and release of a swivel movement of a hook. The release mechanism includes a magnetic switch and a drum that can rotate. The release mechanism also includes at least one latching piece, which can be swiveled about a latching piece axis of rotation and at least one force receiver, which can be swiveled about a swivel axis, together with a pin. The pin can be connected with a locking lug on the drum together with a hook follower on the hook, such that an indirect connection between the hook and the drum, or more particularly, the magnetic switch, can be achieved, and any direct contact between the hook and the magnetic switch is eliminated. In the closed position of the hook the pin makes any swiveling movement of the hook impossible. There is no teaching of a wireless system for controlling the release of the load retainer.

United States Patent Application 20060175851 discloses a cargo hook for an aircraft includes a load beam mounted in a housing and pivotable relative to the housing between a closed position and an open position. A lock mechanism includes a release member that is pivotable relative to the housing between a released position, in which the lock mechanism permits pivotal movement of the load beam from its closed position to its open position, and a locked position, in which the lock mechanism prevents movement of the load beam from its closed position to its open position. A sensor senses whether the release member is in the locked position and an indicator circuit provides different respective indications when the sensor senses that the release member is in the locked position and when the sensor does not sense that the release member is in the locked position. There is no teaching of a wireless system for controlling the release of the load retainer.

U.S. Pat. No. 9,132,995 discloses a controllable hook assembly having an actuator connected by a clutch to a drive assembly configured to limit the connection to a predetermined linear force applied to the actuator. The drive assembly and actuator of the controllable hook assembly also is configured to move a plurality of hook arms between an open and closed position and is adapted capturing a line attached to a load. A controller is configured to operate the drive assembly to move gear teeth in the hook arms cooperating with screw threads in said actuator to provide rotation about a pivot point, drive an actuator output shaft such that when the actuator is energized the linear motion of the actuator output shaft moves the hook arms between an open and a closed position so as to allow for repeated capture of loads by helicopter or other lifting devices without the need for extensive setup for such load capture. The controller may be in wired or wireless communication with the hook, however, there is no teaching of the apparatus or method of wirelessly controlling the hook.

U.S. Pat. No. 9,758,353 discloses a controllable hook assembly having an actuator operably connected to an arm motor assembly and a drive assembly configured to move independently a plurality of hook arms between an open and closed position capture and release a load. A controller is configured to operate each drive assembly to move the hook arms cooperating with screw threads in said actuator to provide rotation about a pivot point to drive each of the hook arms between an open and a closed position so as to allow for independent actuation of each of the hook arms. It is inferred that the controller is in the aircraft. There is no teaching of a wireless system for controlling the release of the load retainer.

U.S. Pat. No. 9,004,557 discloses a release fitting for an elongate strap is provided. The release fitting includes a body configured to fixedly engage an end of an elongate strap. An arm is pivotably connected to the body, such that the arm is configured to pivot between a locked position and a release position, a tip portion of the arm comprises a receiving portion. The body comprises a hole disposed therethrough, the hole being coaxially aligned with the receiving portion when the arm is in the locked position. A shaft assembly slidably is disposed within the hole, the shaft assembly biased toward engagement with the receiving portion. A bracket is pivotably mounted to the body and pivotably mounted to the shaft assembly, wherein rotation of the bracket urges linear motion of the shaft assembly within the hole. An electro-mechanical device may be wirelessly controlled. The electro-mechanical device actuates the opening and closing of a releasing mechanism on the elongate strap. There is no teaching of a wireless system for controlling the release of the load retainer.

United States Patent Application 20180215466 discloses a machine operates in conjunction with an aircraft, such as a helicopter, for harvesting or removing trees. The device can be powered by the aircraft, by electrical or hydraulic connection with the aircraft, or it may have an independent, self-contained power source. The device includes jaws for grasping a tree, and a saw for cutting the tree. The weight of the device is borne by a strong and flexible cord suspended from the aircraft. Various motors enable the position of the device to be remotely controlled, so as to grasp and remove tree trunks. The invention is especially useful for removing trees from areas which are difficult to reach by land. The controller may be controlled by the pilot and may be wireless, however, there is no teaching of the apparatus or method of wirelessly controlling the hook.

An electrical connection between the aircraft and the hook poses a number of significant problems. Firstly, the use of an electrical connection is time consuming as the operator must stretch the long line prior to use. In one example, the long line is attached to a truck and stretched by at least a foot so that the electrical connection does not undone when the load stretches the cable. There must be loops in the electrical wire to account for at least a foot of extension of the cable. Secondly, the electrical connectors need to be secured. As noted above, this is done by wrapping the connectors with electrical tape. Both the stretching and wrapping are time consuming and can lead to operator error. Thirdly, the electrical connectors can come loose or be disconnected, resulting in the load suddenly being released, or the pilot having to land in order to release the load. Fourthly, the use of the electrical connection requires that a slip-ring hub assembly be included in the hook to allow free rotation of the long line so that the electrical connection does not bind. The slip-ring hub adds weight and is an additional failure point. Fifthly, the sheath that wraps the cable and the electrical wire adds drag to the long line and can cause it to be urged upward. In some cases, the long line and hook have interfered with the tail rotor during flight. This has resulted in numerous crashes. Finally, if a synthetic cable is used, it must be inspected for abrasion from time to time, which entails removing it from the sheathing.

What is needed is a safe and simple to use system for the release mechanism on a long line hook that overcomes the deficiencies noted above. It would be preferable if the system was wireless and had an operating range of at least about 300 feet. It would be preferable if the wireless system did not rely upon satellites or cell towers. It would be preferable if the wireless system was a secure system that was not prone to interference. It would be preferable if each hook had a separate wireless channel and that the operator module could be programmed for each separate wireless channel. It would be preferable if the wireless receiver on the hook was housed in a resilient and waterproof case. It would be further preferable if the system was provided as both a kit to upgrade existing hooks and long lines, and as part of newly manufactured hooks.

SUMMARY

The present technology is a safe and simple to use system for the release mechanism on a long line hook that overcomes the deficiencies noted above. The system was wireless and has an operating range of at least about 300 feet. The wireless system is preferably a Bluetooth® based system. The Bluetooth system is a secure system that is not prone to interference. Each hook had a separate wireless channel and the operator module can be programmed for each separate wireless channel. The wireless receiver on the hook is housed in a resilient and waterproof case. The system is provided as both a kit to upgrade existing hooks and long lines, and as part of newly manufactured hooks.

In one embodiment, a wireless assembly is provided for use with a long line, an aircraft and a battery, the wireless assembly comprising: a hook, which includes an electro-mechanical actuator; a waterproof housing mounted on the hook; a wireless receiver which includes a microprocessor, is retained in the waterproof housing and is in electrical communication with the electro-mechanical actuator; a wireless transmitter, which includes a microprocessor; and a switch which is in electrical communication with the wireless transmitter, the wireless transmitter and the switch for locating in the aircraft.

The wireless assembly may further comprise a momentary switch which is in electrical communication with the wireless transmitter.

The wireless assembly may further comprise an unsheathed cable, the cable releasably attached to the hook.

The wireless assembly may further comprise the battery, which is retained in the waterproof housing and is in electrical communication with the wireless receiver.

In the wireless assembly, the wireless receiver may be a Bluetooth receiver and the wireless transmitter is a Bluetooth transmitter.

In the wireless assembly, the wireless receiver may be a WiFi receiver and the wireless transmitter is a WIFi transmitter.

In the wireless assembly, the receiver may be a transceiver and the transmitter is a transceiver.

In another embodiment, a kit is provided for use with a long line hook, the kit comprising: a waterproof housing for mounted on the long line hook; a wireless receiver which includes a microprocessor which is retained in the waterproof housing; an electrical connector which is in electrical communication with the receiver and is for electrical connection with an actuator on the long line hook; a wireless transmitter, which includes a microprocessor; and a switch which is in electrical communication with the wireless transmitter, the wireless transmitter and the switch for locating in an aircraft.

The kit may further comprise a momentary switch which is in electrical communication with the wireless transmitter.

The kit may further comprise a momentary switch which is in electrical communication with the wireless transmitter.

The kit may further comprise the battery, which is removably retained in the waterproof housing and is in electrical communication with the wireless receiver.

In another embodiment, a method of wirelessly releasing a load from a hook on a long line attached to a helicopter is provided, the method comprising: selecting a wireless system that actuates an electro-mechanical actuator on the hook; transmitting a release signal from the helicopter with the wireless system; receiving the signal at the hook with the wireless system; and the wireless system actuating the electro-mechanical actuator.

In the method, the wireless system may transmit a Bluetooth signal and receives the Bluetooth signal.

In the method, the wireless system may transmit a WiFi signal and receive the WiFi signal.

In the method, the wireless system may comprise a hook transceiver and a helicopter transceiver, and the method may further comprise the hook transceiver sending a signal to the helicopter transceiver prior to transmitting the release signal from the helicopter.

In the method, the helicopter transceiver may search for the signal and identify the signal prior to transmitting the release signal from the helicopter.

In the method, the helicopter transceiver may make a secure connection prior to transmitting the release signal from the helicopter.

In another embodiment, a wireless long line system is provided for use with an aircraft and a battery, the wireless long line system comprising: a long line; a hook, which includes an electro-mechanical actuator and is releasably attached to the long line; a waterproof housing mounted on the hook; a wireless receiver which includes a microprocessor, is retained in the waterproof housing and is in electrical communication with the electro-mechanical actuator; a wireless transmitter, which includes a microprocessor; and a switch which is in electrical communication with the wireless transmitter, the wireless transmitter and the switch for locating in the aircraft.

The wireless long line system may further comprise a momentary switch which is in electrical communication with the wireless transmitter.

The wireless long line system may further comprise an unsheathed cable, the cable releasably attached to the hook.

The wireless long line system may further comprise the battery, which is retained in the waterproof housing and is in electrical communication with the wireless receiver.

In the wireless long line system, the wireless receiver may be a Bluetooth receiver and the wireless transmitter may be a Bluetooth transmitter.

In the wireless long line system, the wireless receiver may be a WiFi receiver and the wireless transmitter may be a WIFi transmitter.

In the wireless long line system, the receiver may be a transceiver and the transmitter may be a transceiver.

FIGURES

DESCRIPTION

Except as otherwise expressly provided, the following rules of interpretation apply to this specification (written description and claims): (a) all words used herein shall be construed to be of such gender or number (singular or plural) as the circumstances require; (b) the singular terms "a", "an", and "the", as used in the specification and the appended claims include plural references unless the context clearly dictates otherwise; (c) the antecedent term "about" applied to a recited range or value denotes an approximation within the deviation in the range or value known or expected in the art from the measurements method; (d) the words "herein", "hereby", "hereof", "hereto", "hereinbefore", and "hereinafter", and words of similar import, refer to this specification in its entirety and not to any particular paragraph, claim or other subdivision, unless otherwise specified; (e) descriptive headings are for convenience only and shall not control or affect the meaning or construction of any part of the specification; and (f) "or" and "any" are not exclusive and "include" and "including" are not limiting. Further, the terms "comprising," "having," "including," and "containing" are to be construed as open-ended terms (i.e., meaning "including, but not limited to,") unless otherwise noted.

Recitation of ranges of values herein are merely intended to serve as a shorthand method of referring individually to each separate value falling within the range, unless otherwise indicated herein, and each separate value is incorporated into the specification as if it were individually recited herein. Where a specific range of values is provided, it is understood that each intervening value, to the tenth of the unit of the lower limit unless the context clearly dictates otherwise, between the upper and lower limit of that range and any other stated or intervening value in that stated range, is included therein. All smaller sub ranges are also included. The upper and lower limits of these smaller ranges are also included therein, subject to any specifically excluded limit in the stated range.

Unless defined otherwise, all technical and scientific terms used herein have the same meaning as commonly understood by one of ordinary skill in the relevant art. Although any methods and materials similar or equivalent to those described herein can also be used, the acceptable methods and materials are now described.

Figure 1:
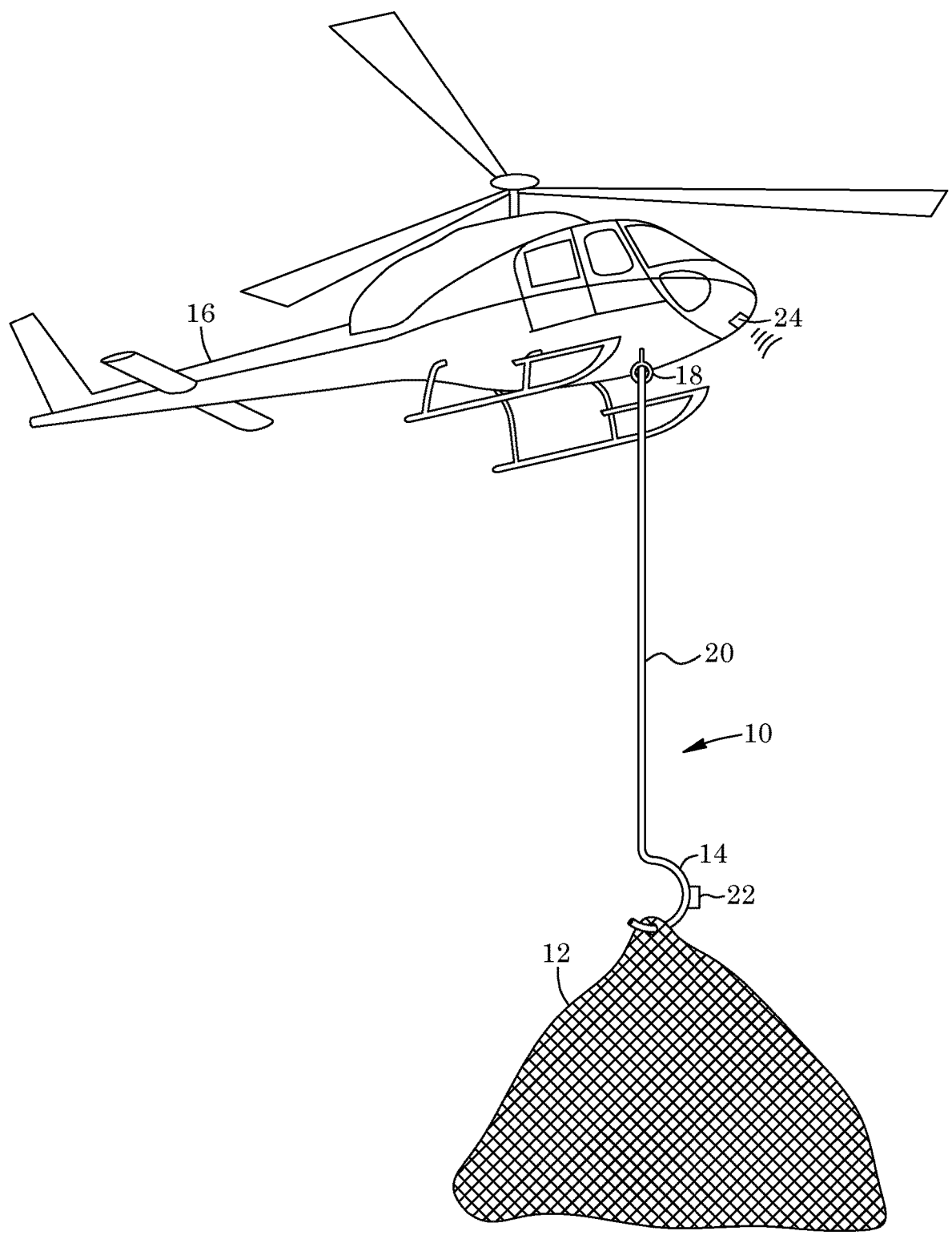
FIG. 1 is a schematic of the wireless long line and hook assembly of the present technology.

A wireless long line and hook assembly, generally referred to as 10 is shown in FIG. 1, attached to a sling 12 at the hook 14 and a helicopter 16 at the helicopter belly hook 18. The long line 20 is unsheathed and consists only of a cable—there is no need for an electrical wire or an extension cord and no sheath is required. The hook 14 includes a wireless receiver 22. A wireless transmitter 24 is located within the helicopter 16.

Figure 2:
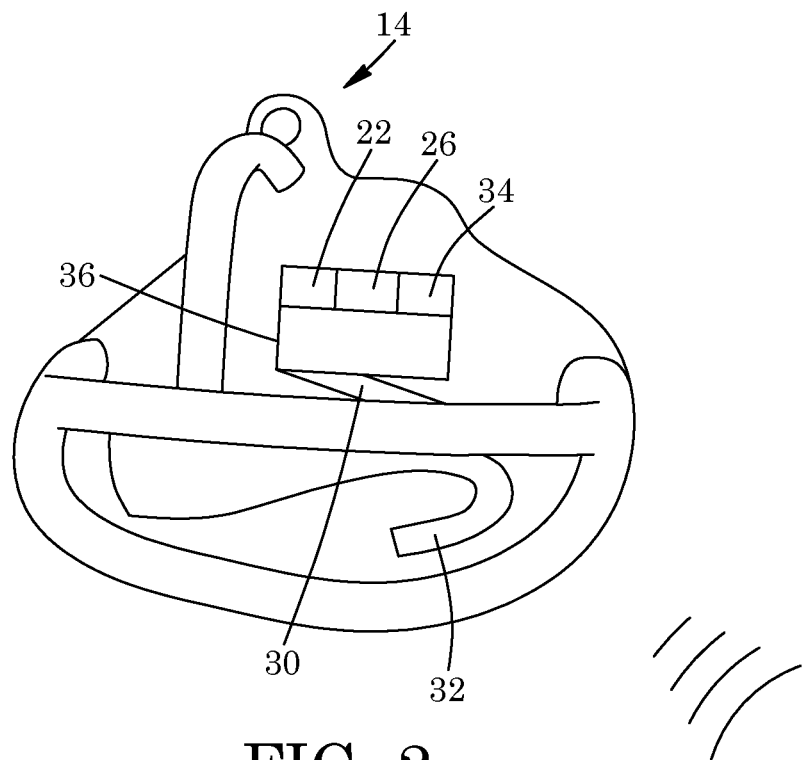
FIG. 2 is a schematic of the hook end of the assembly.

The details of the assembly at the hook 14 are shown in FIG. 2. The wireless receiver 22 is a Bluetooth receiver or transceiver. It operates on a preprogrammed dedicated channel and is controlled by a microprocessor 26. The microprocessor 26 is in electrical communication with an electro-mechanical linkage 30, which may be, but is not limited to a linear actuator, a worm drive stepper or a servo. The electro-mechanical linkage 30 is in mechanical communication with the hook release 32. The wireless receiver 22 is in electrical communication with a battery 34. The wireless receiver 22, with its microprocessor 26 and the battery 34 are housed in a waterproof, resilient housing 36 which is affixed to the hook 14.

Figure 3:
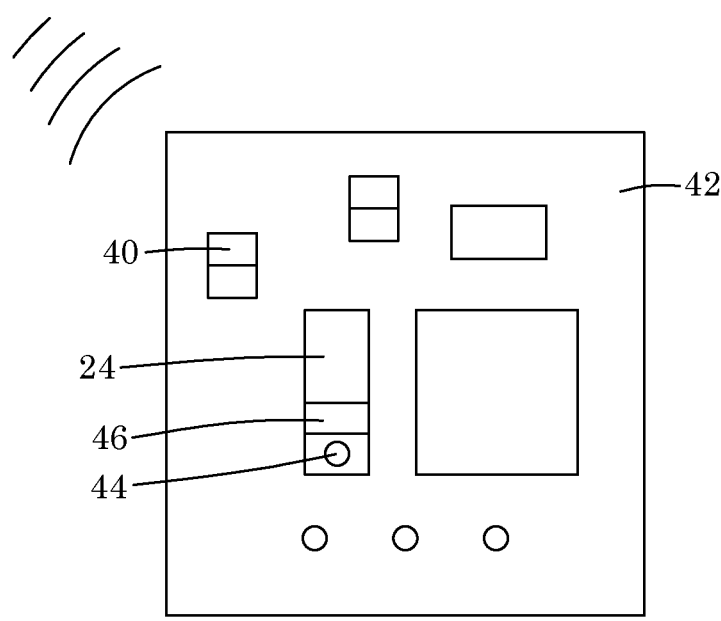
FIG. 3 is a schematic of the helicopter end of the assembly.

The details of the assembly at the helicopter 16 are shown in FIG. 3. A toggle switch 40 is mounted to the helicopter control panel 42. It is in electrical communication with the wireless transmitter 24, which is a Bluetooth transmitter or transceiver. The wireless transmitter 24 includes a microprocessor 46 and a momentary button 44.

In one embodiment, both the hook 14 and the helicopter 16 have transceivers (referred to as the hook transceiver and the helicopter transceiver respectively) rather than a receiver and a transmitter respectively. The hook transceiver 22 emits a signal. The helicopter transceiver 24 is configured to search for a signal from the hook transceiver 22. A secure connection is then made between the helicopter transceiver 24 and the hook transceiver 22 using Bluetooth protocols. Once a secure connection is established the pilot activates a momentary button 44 to test the Bluetooth connection, thus releasing the hook release 32. The pilot or a choker on the ground ensures that the hook release 32 is then closed and the helicopter 16 safely lifts the load. Upon arriving at the drop-off site, the pilot lowers the load and then again activates the momentary button 44, which actuates the electromagnetic linkage 30, which in turn, releases the hook release 32.

In another embodiment, the hook 14 has a receiver 22 and the helicopter 16 has a transmitter 24. The microprocessors 26, 42 are preprogrammed to a selected, secure channel.

Figure 4:
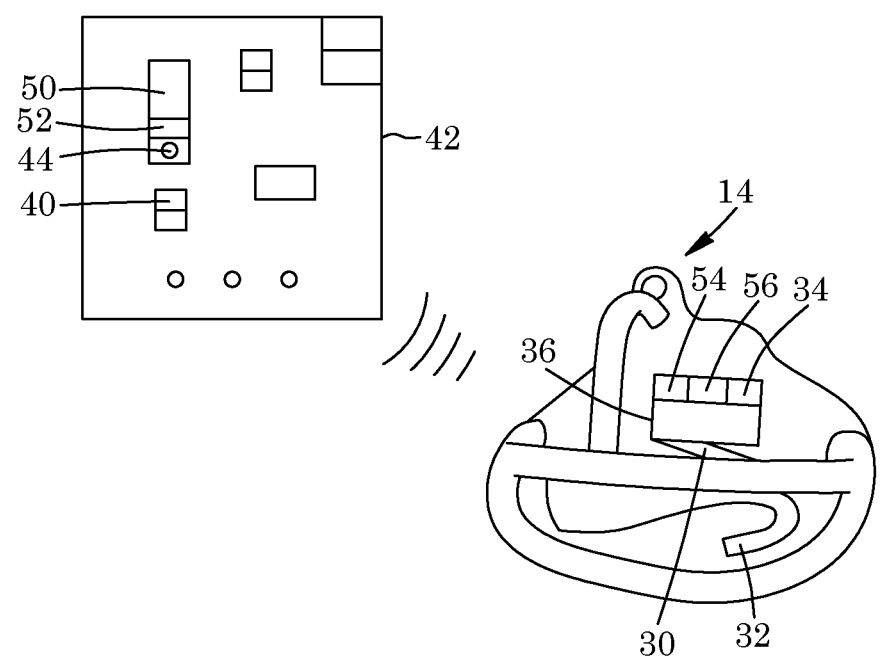
FIG. 4 is a schematic of an alternative embodiment.

In yet another embodiment, shown in FIG. 4, communication is via WiFi (IEEE 802.11). The helicopter control panel 42 has a WiFi transceiver 50 with a microprocessor 52. The toggle switch 40 and the momentary switch 44 are the same as for FIG. 3. The hook 14 also has a WiFi transceiver 54 with a microprocessor 56. The battery 34 is the same as for FIG. 2. The hook WiFi transceiver 54 emits a signal. The helicopter WiFi transceiver 52 is configured to search for a signal from the hook WiFi transceiver 54. Once the signal is identified, a secure connection is then made between the helicopter WiFi transceiver 52 and the hook WiFi transceiver 54 using IEEE 802.11 protocols. Once a secure connection is established the pilot activates the momentary button 44 to test the secure WiFi connection, thus releasing the hook release 32. The pilot or a choker on the ground ensures that the hook release 32 is then closed and the helicopter 14 safely lifts the load. Upon arriving at the drop-off site, the pilot lowers the load and then again activates the momentary button 44, which actuates the electro-magnetic linkage 30, which in turn, releases the hook release 32.

Figure 5:
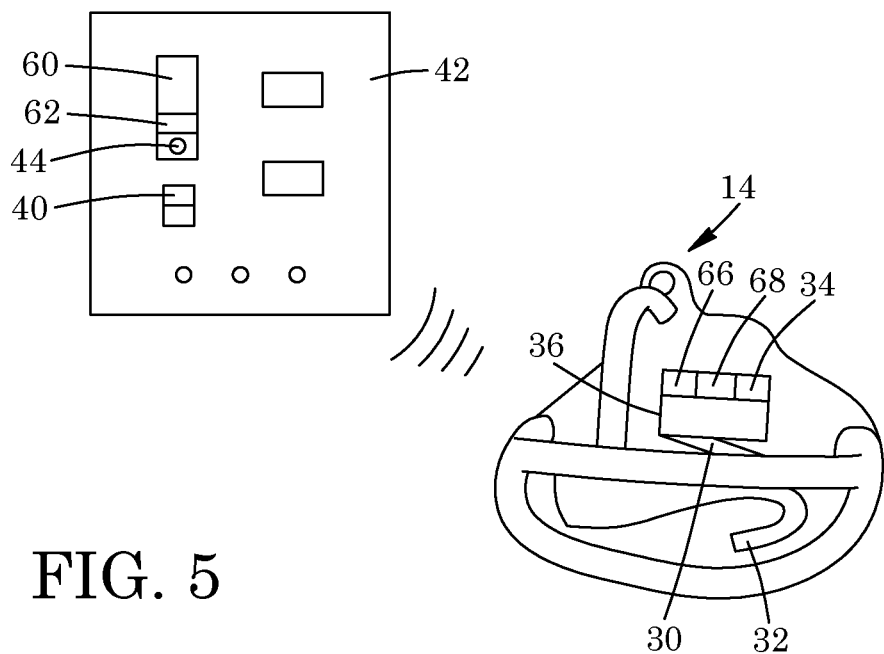
FIG. 5 is a schematic of another alternative embodiment.

In yet another embodiment, shown in FIG. 5, Radio Frequency Identification (RFID) is used to communicate between the helicopter 16 and the hook release 32. The helicopter 16 has a radio transmitter 60 with a microprocessor 62 on the control panel 42. Ultra High Frequency (UHF) RFID is used (the frequency is about 300 MHz to about 960 MHz). The toggle switch 40 and the momentary switch 44 are the same as for FIG. 3. The hook 14 has a reader 64 with a microprocessor 56. Once a secure connection is established the pilot activates the momentary button 44 of the radio transmitter 60 to test the secure RFID connection, thus releasing the hook release 32. The pilot or a choker on the ground ensures that the hook release 32 is then closed and the helicopter 14 safely lifts the load. Upon arriving at the drop-off site, the pilot lowers the load and then again activates the momentary button 44 of the radio transmitter 60, which actuates the electro-magnetic linkage 30, which in turn, releases the hook release 32.

Figure 6:
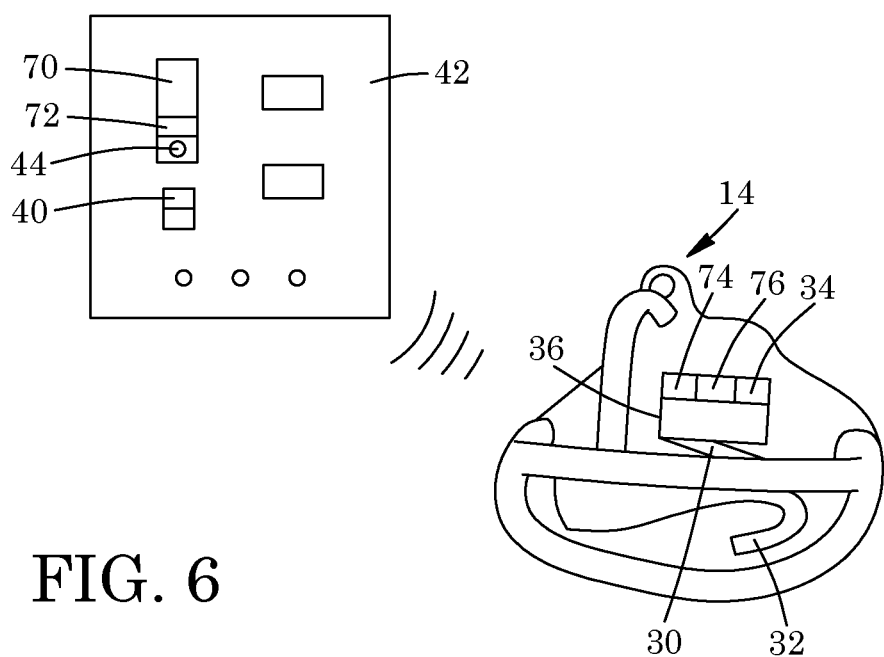
FIG. 6 is a schematic of another alternative embodiment.

In yet another embodiment, shown in FIG. 6, infrared light is used to communicate between the helicopter 16 and the hook release 32. The helicopter 16 has an infrared light transmitter 70 with a microprocessor 72. The toggle switch 40 and the momentary switch 44 are the same as for FIG. 3. The hook 14 has a reader 74 with a microprocessor 76. The battery 34 is the same as for FIG. 2. Once a secure connection is established the pilot activates the momentary button 44 of the infrared light transmitter 60 to test the secure connection, thus releasing the hook release 32. The pilot or a choker on the ground ensures that the hook release 32 is then closed and the helicopter 14 safely lifts the load. Upon arriving at the drop-off site, the pilot lowers the load and then again activates the momentary button 44 of the infrared light transmitter 70, which actuates the electromagnetic linkage 30, which in turn, releases the hook release 32.

Figure 7:
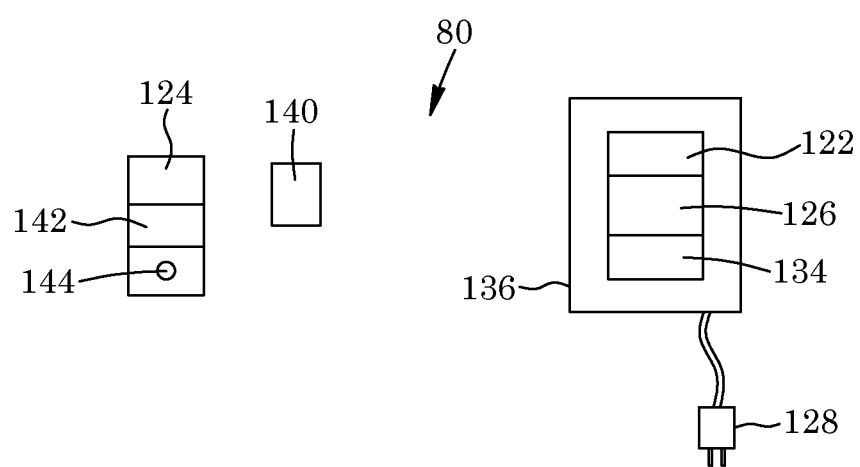
FIG. 7 is schematic of a kit of the present technology.

In yet another embodiment, a kit, generally referred to as 80 is provided as shown in FIG. 7. The kit 80 allows a user to upgrade existing hooks and long lines. The kit includes a wireless receiver 122 for locating on the hook 14 and a wireless transmitter 124 for locating within the helicopter 16.

The wireless receiver 122 for the hook 14 is a Bluetooth receiver or transceiver. It operates on a preprogrammed dedicated channel and is controlled by a microprocessor 126. The wireless receiver 122 has an electrical plug 128 for plugging into the female end of the extension cord on the hook 14. A battery 134 is also provided as part of the kit. The wireless receiver 122, with its microprocessor 126 and the battery 134 are housed in a waterproof, resilient housing 136 which is for affixing to the hook 14.

A toggle switch 140 is in electrical communication with the wireless transmitter 124, is a Bluetooth transmitter or transceiver. The wireless transmitter 124 includes a microprocessor 142 and a momentary button 144. The toggle switch is mounted on the control panel of the aircraft. The wireless transmitter 124 may be mounted or be hand-held. As for the embodiments described above, the hook wireless receiver 122 may be a WiFi transceiver and the helicopter wireless transmitter may be a WiFi transceiver.

While example embodiments have been described in connection with what is presently considered to be an example of a possible most practical and/or suitable embodiment, it is to be understood that the descriptions are not to be limited to the disclosed embodiments, but on the contrary, is intended to cover various modifications and equivalent arrangements included within the spirit and scope of the example embodiment. Those skilled in the art will recognize or be able to ascertain using no more than routine experimentation, many equivalents to the specific example embodiments specifically described herein. For example, the present technology may also be used for short lines. Further, the wireless communication may, in alternative embodiments, include as yet discovered and implemented wireless technologies. Such equivalents are intended to be encompassed in the scope of the claims, if appended hereto or subsequently filed.

What is claimed is:

1. A wireless assembly for use with a long line, an aircraft and a battery, the wireless assembly comprising: a long line hook, which includes an electro-mechanical actuator; a waterproof housing mounted on the long line hook; a wireless receiver which includes a microprocessor, is retained in the waterproof housing and is in electrical communication with the electro-mechanical actuator; a wireless transmitter, which includes a microprocessor; a monetary switch which is in electrical communication with the wireless transmitter; and a switch which is in electrical communication with the wireless transmitter, the wireless transmitter and the switch for locating in the aircraft, wherein the long line is an unsheathed cable, the cable releasably attached to the long line hook.

2. The wireless assembly of claim 1, further comprising the battery, which is retained in the waterproof housing and is in electrical communication with the wireless receiver.

3. The wireless assembly of claim 2, wherein the wireless receiver is a Bluetooth receiver and the wireless transmitter is a Bluetooth transmitter.

4. The wireless assembly of claim 3, wherein the wireless receiver is a WiFi receiver and the wireless transmitter is a WIFi transmitter.

5. The wireless assembly of claim 4, wherein the receiver is a transceiver and the transmitter is a transceiver.

6. A non-autonomous wireless long line system for use with an aircraft and a battery, the wireless long line system comprising: a long line; a long line hook, which includes an electro-mechanical actuator and is releasably attached to the long line; a waterproof housing mounted on the long line hook; a wireless receiver which includes a microprocessor, is retained in the waterproof housing and is in electrical communication with the electro-mechanical actuator; a wireless transmitter, which includes a microprocessor; a momentary switch which is in electrical communication with the wireless transmitter; and a switch which is in electrical communication with the wireless transmitter, the wireless transmitter and the switch for locating in the aircraft, wherein the long line is an unsheathed cable, the unsheathed cable releasably attached to the long line hook.

7. A non-autonomous wireless long line system for use with an aircraft and a battery, the wireless long line system comprising: a long line; a long line hook, which includes an electro-mechanical actuator and is releasably attached to the long line; a waterproof housing mounted on the long line hook; a wireless receiver which includes a microprocessor, is retained in the waterproof housing and is in electrical communication with the electro-mechanical actuator; a wireless transmitter, which includes a microprocessor; and a switch which is in electrical communication with the wireless transmitter, the wireless transmitter and the switch for locating in the aircraft, wherein the long line is an unsheathed cable, the unsheathed cable releasably attached to the long line hook.

* * * * *